(12) United States Patent
Riedel

(10) Patent No.: US 8,850,504 B2
(45) Date of Patent: Sep. 30, 2014

(54) METHOD AND SYSTEM FOR COMPARING MEDIA ASSETS

(75) Inventor: Gregg William Riedel, New York, NY (US)

(73) Assignee: Viacom International Inc., New York, NY (US)

( * ) Notice: Subject to any disclaimer, the term of this patent is extended or adjusted under 35 U.S.C. 154(b) by 535 days.

(21) Appl. No.: 12/759,428

(22) Filed: Apr. 13, 2010

(65) Prior Publication Data

US 2011/0252455 A1  Oct. 13, 2011

(51) Int. Cl.
*H04N 7/173* (2011.01)
*H04N 7/16* (2011.01)
*G06F 17/30* (2006.01)

(52) U.S. Cl.
CPC ............................. *G06F 17/30861* (2013.01)
USPC ............................ 725/115; 725/138; 725/145

(58) Field of Classification Search
USPC .......................... 725/114, 115, 138, 144, 145
See application file for complete search history.

(56) References Cited

U.S. PATENT DOCUMENTS

| | | | | |
|---|---|---|---|---|
| 5,745,756 A * | 4/1998 | Henley | ........................ | 707/999.2 |
| 6,446,082 B1 * | 9/2002 | Arita | ............................... | 707/966 |
| 6,453,325 B1 * | 9/2002 | Cabrera et al. | ......... | 707/999.202 |
| 6,581,076 B1 * | 6/2003 | Ching et al. | .................... | 707/667 |
| 7,379,978 B2 * | 5/2008 | Anderson et al. | ...... | 707/999.003 |
| 7,434,142 B2 | 10/2008 | Cuttner et al. | | |
| 7,434,144 B2 | 10/2008 | Cuttner et al. | | |
| 2002/0169871 A1 * | 11/2002 | Cravo de Almeida et al. | ............................. | 709/224 |
| 2003/0028896 A1 * | 2/2003 | Swart et al. | .................... | 725/127 |
| 2004/0059996 A1 | 3/2004 | Fasciano | | |
| 2008/0301746 A1 * | 12/2008 | Wiser et al. | .................... | 725/114 |
| 2009/0077084 A1 * | 3/2009 | Svendsen | .......................... | 707/9 |
| 2010/0121815 A1 * | 5/2010 | Silverman et al. | ............ | 707/610 |

FOREIGN PATENT DOCUMENTS

WO  2005/104130  11/2005
WO  2009/131861  10/2009

OTHER PUBLICATIONS

European Search Report for European Patent Application No. 11162257.7 mailed Jul. 7, 2011 (5 pgs.).

* cited by examiner

*Primary Examiner* — Randy Flynn
(74) *Attorney, Agent, or Firm* — Fay Kaplun & Marcin, LLP

(57) ABSTRACT

A computer-implemented method and system that features retrieving, with a comparator module, a first characteristic of a first media asset and associated with a first media asset identifier from a media server storing a plurality of media assets. A second characteristic of a second media asset associated with a second media asset identifier from an archive server is retrieved with the comparator module. The comparator module is utilized to compare the first characteristic to the second characteristic based on an association of the first media asset identifier and the second asset media identifier. A report that includes an indication of the result of the comparison of the first characteristic and the second characteristic is generated by the comparator module.

20 Claims, 6 Drawing Sheets

420 — EPIX2E-SD-T15: EPIX2E-SD-T15 (EPIX2E-SD-T15)

425 — No Discrepancies

430 — Total Assets:            513
Time:                   38 seconds
Cache hit percentage:   0%

440 — Scan Summary

Servers Scanned:        1
Total Assets:           513
Time:                   38 seconds.
445 — Cache hit percentage:   0%

METHOD AND SYSTEM FOR COMPARING MEDIA ASSETS

FIELD OF THE INVENTION

The invention generally relates to methods and systems for comparing media assets stored on multiple servers. More particularly, the invention relates to comparing characteristics of media assets stored on multiple servers.

BACKGROUND

Television networks often store their media content across multiple special purpose servers. For example a server can be a central archive for all of the network's media content. This server is designed to manage large amounts of media content securely and robustly to avoid the loss of any of the network's media content. A separate media server can provide the broadcast signal, media stream, or other manner of transmission of the media content to users. The media server often does not store large amounts of media content, rather it stores only the media content that it will broadcast in the near future. When using such a configuration, the media server downloads media content from the archive servers prior to broadcast.

Various problems can occur when the media server downloads media content from the archive server. For example, the download can terminate before an entire media file transfers. In other instances, the media file can be corrupted. Often the error is not discovered until the media server attempts to broadcast the media and the signal goes to black, which is an undesirable result for any network. Accordingly, an efficient mechanism for determining whether the media content stored on the video server is incomplete or corrupt is desirable.

SUMMARY OF THE INVENTION

In one aspect the invention features a computer-implemented method. In one embodiment, the method includes retrieving, with a comparator module, a first characteristic of a first video file and associated with a first identifier from a video server storing a plurality of video files. The method includes retrieving, with the comparator module, a second characteristic of a second video file associated with a second identifier from an archive video server. The method includes utilizing the comparator module to compare the first characteristic to the second characteristic based on an association of the first identifier and the second identifier. The method includes analyzing, by the comparator module, the result of the comparison of the first characteristic and the second characteristic to determine if the first video file should be replaced. The method includes acquiring, with the video server, a third video file associated with the second identifier from the archive server and replacing, on the video server, the first video file with the third video file if the result of the comparison indicates that the first video file should be replaced. The method includes broadcasting the first video file based on a predetermined schedule if the result of the comparison indicates that the first video file should not be replaced.

In another aspect, the invention features a system. In one embodiment, the system includes a video server that stores a first video file, the first video file associated with a first identifier and described by a first characteristic. The system includes an archive server that stores a second video file, the second video file associated with a second identifier and described by a second characteristic. The system includes a comparator module in communication with the video server to retrieve the first characteristic based on the first identifier and in communication with the archive server to retrieve the second characteristic based on the second identifier, with the comparator module configured to compare the first characteristic and the second characteristic based on an association of the first identifier and the second identifier and generate a signal based on a result of the comparison of the first characteristic and the second characteristic, with the video server configured to receive the signal and acquire a third video file associated with the second identifier if the result is a first pre-defined value and the video server configured to broadcast the first video file according to a predetermined schedule if the result is a second pre-defined value.

In another aspect, the invention features a computer-implemented method. In one embodiment, the method includes retrieving, with a comparator module, a first characteristic of a first media asset and associated with a first media asset identifier from a media server storing a plurality of media assets. The method includes retrieving, with the comparator module, a second characteristic of a second media asset associated with a second media asset identifier from an archive server. The method includes utilizing the comparator module to compare the first characteristic to the second characteristic based on an association of the first media asset identifier and the second asset media identifier. The method includes generating, by the comparator module, a report that includes an indication of the result of the comparison of the first characteristic and the second characteristic.

In another aspect, the invention features a system. In one embodiment, the system includes a media server that stores a first media asset, the first media asset associated with a media identifier and described by a first characteristic. The system includes an archive server that stores a second media asset, the second media asset associated with the media identifier and described by a second characteristic. The system includes a comparator module communicably coupled to the media server to retrieve the first characteristic based on the media identifier and communicably coupled to the archive server to retrieve the second characteristic based on the media identifier, the comparator module configured to compare the first characteristic and the second characteristic and generate a signal based on the comparison of the first characteristic and the second characteristic.

In still another aspect, the invention features a computer readable medium bearing instructions. In one embodiment, the medium includes instructions to cause one or more computers to retrieve a first characteristic of a first media asset and associated with a first media asset identifier from a media server storing a plurality of media assets. The medium includes instructions to cause one or more computers to retrieve a second characteristic of a second media asset associated with a second media asset identifier from an archive server. The medium includes instructions to cause one or more computers to compare the first characteristic to the second characteristic based on an association of the first media asset identifier and the second asset media identifier. The medium includes instructions to cause one or more computers to generate a report that includes an indication of the result of the comparison of the first characteristic and the second characteristic.

Any of the above aspects can include one or more of the following features. The method can include the comparator module retrieving a third characteristic describing a fourth video file and associated with a third identifier from a second video server storing a plurality of video files. The method can include the comparator module retrieving a fourth characteristic describing a fifth video file associated with a fourth identifier from a second archive video server. The method can include utilizing the comparator module to compare the third characteristic to the fourth characteristic based on an association of the third identifier and the fourth identifier. The method can include the comparator module generating a report that includes an indication of the result of the comparison of the third characteristic and the fourth characteristic.

Any of the above aspects can include one or more of the following features. The method can include the comparator module retrieving a third characteristic describing a third media asset and associated with a third media identifier from a second media server storing a plurality of media assets. The method can include the comparator module retrieving a fourth characteristic describing a fourth media asset associated with a fourth media identifier from a second archive server. The method can include utilizing the comparator module to compare the third characteristic to the fourth characteristic based on an association of the third identifier and the fourth identifier. The method can include the comparator module generating a report that includes an indication of the result of the comparison of the third characteristic and the fourth characteristic.

Any of the above aspects can include one or more of the features described in the following paragraphs of this section. The second media server can be the same as the first media server and the second archive server can be the same as the first archive server. In one embodiment the signal can be an email. In one embodiment the first and second characteristics are one of file size, file type, bitrate, and file encoding.

The method can include generating a signal to one or more devices wherein the signal comprises data that reflects the report. In one embodiment the method can include retrieving the second media asset from the archive server when the first characteristic does not match the second characteristic. In one embodiment retrieving a first characteristic can include retrieving the first characteristic describing the first media asset and associated with the first media identifier from a plurality of media servers.

The comparator module can be configured to generate a second signal with instructions to the media server to store the second media asset and replace the first media asset when the first characteristic does not match the second characteristic. In one embodiment the signal can be an email. In one embodiment the comparator module can include a list of one or more ignored media identifiers, such that the comparator module does not retrieve the first characteristic or the second characteristic if the associated media identifier matches the one or more ignored media asset identifier. In one embodiment the signal and the second signal can comprise an email.

The system can include a second media server storing a third media asset, the third media asset associated with the media identifier and described by a third characteristic, the comparator unit communicably coupled to the second media server to retrieve the media asset identifier and the third characteristic such that the comparator module transmits a second signal to one or more devices if the third characteristic matches the second characteristic.

The medium can bear instructions to cause one or more computers to retrieve a third characteristic describing a third media asset and associated with a third media identifier from a second media server storing a plurality of media assets. The medium can bear instructions to cause one or more computers to retrieve a fourth characteristic describing a fourth media asset associated with a fourth media identifier from a second archive server. The medium can bear instructions to cause one or more computers to compare the third characteristic to the fourth characteristic based on an association of the third identifier and the fourth identifier. The medium can bear instructions to cause one or more computers to generate a report that includes an indication of the result of the comparison of the third characteristic and the fourth characteristic.

The medium can bear instructions to cause one or more computers to generate a signal to one or more devices wherein the signal comprises data that reflects the report. The medium can bear instructions to cause one or more computers to retrieve the second media asset from the archive server when the first characteristic does not match the second characteristic.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead being placed upon the principles of the invention.

FIG. 4a is an exemplary diagram illustrating a report, according to an illustrative embodiment of the invention.

DETAILED DESCRIPTIONS

Figure 1:
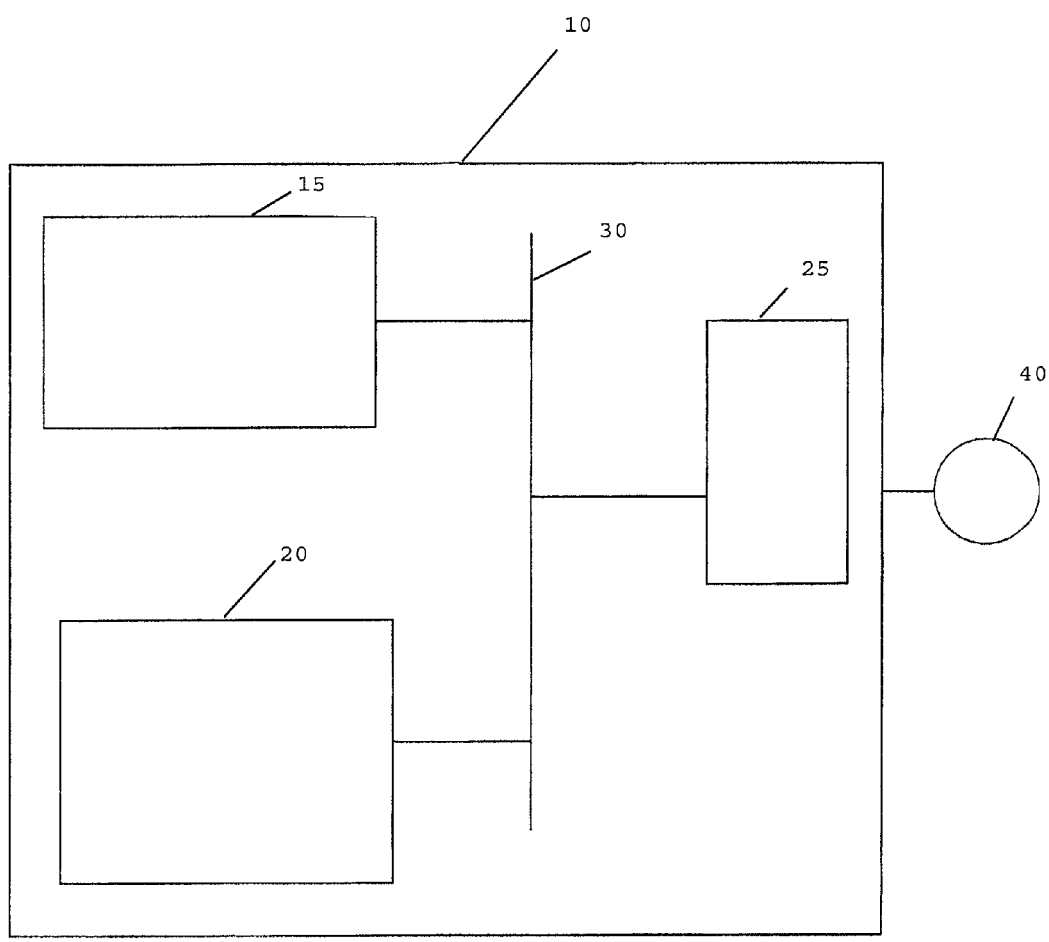
FIG. 1 is an exemplary diagram illustrating a comparator module, according to an illustrative embodiment of the invention.

FIG. 1 is an exemplary diagram illustrating a comparator module 10, which can include a processing module 15, a memory 20, a communication module 25, and a communications bus 30, according to an illustrative embodiment of the invention. The processing module 15, the memory 20, and the communication module 25 are communicably coupled by bus 30.

The processor 15 can access and retrieve information from memory 20 via bus 30. The processor can store information to memory 20 via bus 30. The processor 15 can send information to the communication module 25 via bus 30 causing the information to be sent over network 40. The processor 15 can receive information from communication module 25 via bus 30 from network 40.

In some embodiments, a computer includes comparator module 10. A PDA, smart phone, or other portable computing device can also include a comparator module 10. Comparator module 10 can be any computing device communicably coupled to network 40. Comparator module 10 can be implemented as hardware or as software running on a general purpose computing device.

In some embodiments, comparator module 10 is implemented as a software module. Comparator module 10 can be written in C, C++, C#, or any other suitable programming language.

Network 40 can be a local area network ("LAN") or a wide area network ("WAN"), e.g., the Internet, and include both wired and wireless networks. In some embodiments, network 40 can feature virtual networks or sub-networks such as a virtual local area network ("VLAN"). Unless clearly indicated otherwise, network 40 can also include all or a portion of the public switched telephone network ("PSTN"), for example, a portion owned by a specific carrier.

Figure 2:
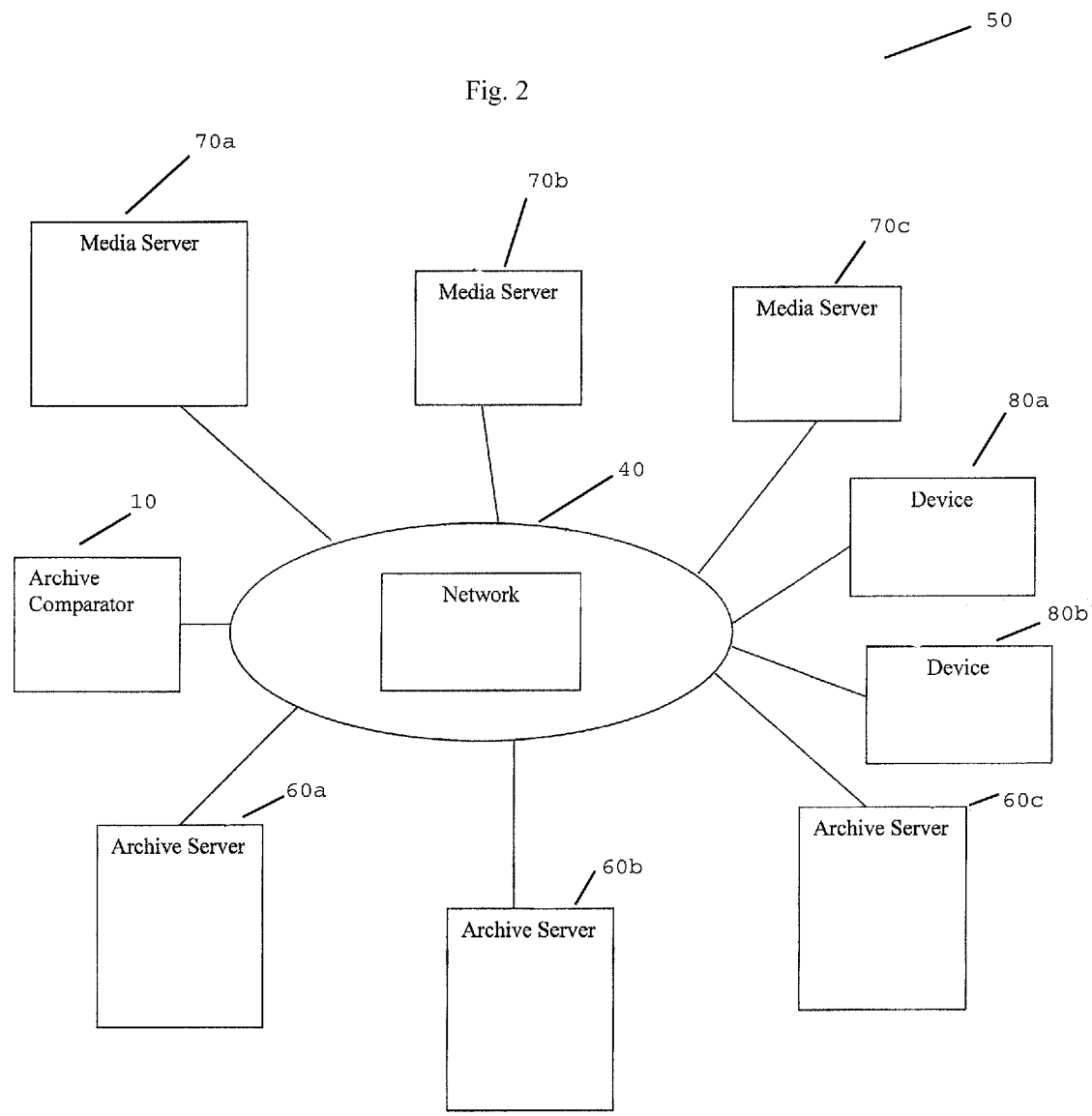
FIG. 2 is an exemplary diagram illustrating a system, according to an illustrative embodiment of the invention.

FIG. 2 is an exemplary diagram illustrating a system 50, according to an illustrative embodiment of the invention. System 50 can include archive servers 60a, 60b, and 60c (generally 60). System 50 can include media servers 70a, 70b, and 70c (generally 70). System 50 can include devices 80a and 80b (generally 80). System 50 can also include comparator module 10. Archive servers 60, media servers 70, devices 80, and comparator module 10 are communicably coupled by network 40.

Archive servers 60 and media servers 70 can store media content. Examples of media content can include music, television programs, music videos, or films. In some embodiments, archive servers 60 and media servers 70 can store media content in the form of media assets. Media assets can be one or more digital files representing media content. The digital files can be in MPEG-2, MXF, PINNACLE, or SEACHANGE formats. A media asset can be files used for reproducing the media content in some embodiments. Moreover, a media asset is a particular instance of storage of media content's constituent files.

Media assets are associated with media asset identifiers. A media asset identifier can be an alphanumeric string. In some embodiments, the characters of a media asset identifier relate to the media content of the associated media asset, such as including indicia of the show, season, and episode. A media asset identifier can uniquely identify media content within system 50. For example, a particular movie, in a particular encoding, is associated with a media asset identifier. A media asset that comprises the files for the particular movie, in a particular encoding, is associated with the same media asset identifier. Additionally, any copy of the media asset is associated with the media asset identifier.

In some embodiments, each media asset identifier is uniquely associated with each media asset. In some embodiments, a media asset identifier is associated with a media asset based on a characteristic of the media asset. Media assets also have characteristics in some embodiments. Characteristics can relate to file or files constituting the media asset. For example, a characteristic can be file name, file size, file type, or file date stamp. Characteristics can relate to the media content, such as title, encoding, dimensions, playout restrictions, or checksum.

An archive server can be any device capable of storing media assets and transmitting copies of the stored media assets over network 40. Examples of commercially available archive servers can include FRONTPORCH DIVA, AVID SPOT SAN, OMNEON MEDIAGRID, or SEACHANGE archive servers.

Media servers 70 can be any device capable of storing media assets and acquiring copies of media assets over network 40. Media servers can also provide playout of media assets. Playout refers to broadcasting, streaming, or serving the media asset. Examples of commercially available media servers can include PINNACLE MEDIASTREAM, OMNEON MEDIADECK or Spectrum, OMNIBUS, or PUBLITRONIC video servers.

In some embodiments, media servers 70 acquire media assets from archive servers 60. For example, media server 70a can request through network 40 from archive server 60a a copy of a media asset associated with a pre-determined media asset identifier. Archive server 60a can then provide a copy of the media asset through network 40 to media server 70a. Media server 70a can store the copy as a media asset associated with the pre-determined media asset identifier. In some embodiments, media server 70 connects to an ftp server running on archive server 60.

The preceding example describes media server 70a acquiring a media asset from archive server 60a. It should be appreciated that in some embodiments any media server 70 can acquire media assets from any archive server 60. For example, media server 70a can acquire media assets from archive server 60c. In some embodiments, a media server can acquire media assets from any archive server to which it is communicably coupled.

In some embodiments, media servers 70 acquire media assets from a subset of archive servers 60. For example, in some embodiments, media servers 70a and 70b are not configured to interface with archive server 60a due to technical incompatibility. In some embodiments, media servers 70 cannot connect to archive servers 60 due to security restrictions.

In some embodiments, media servers 70 playout media assets on a pre-determined schedule. For example, server 70a can be scheduled to play a piece of media content associated with a media asset identifier at a pre-determined time. At some time prior to the media content's scheduled playout, media server 70a can acquire a media asset associated with the media asset identifier from archive server 60a. Media server 70a can store the media asset until and throughout playout. Media server 70a can retain the media asset after playout. In the alternative, media server 70a can discard the media asset after playout. In embodiments where the media asset is discarded, the media server 70a can reacquire a media asset associated with the media asset identifier from archive server 60a prior to the next scheduled playout.

In some embodiments, media servers 70 can store multiple media assets prior to playout. For example, media server 70b can acquire a first media asset from archive server 60a. Media server 70b can acquire a second media asset from archive server 60b. The first media asset can be a particular movie scheduled to playout at a pre-determined time. In some embodiments, the first media asset and the second media asset are different. The second media asset can be a particular documentary scheduled to playout after the first media asset.

Comparator module 10 can compare characteristics of two or more media assets to determine whether the media assets on media servers 70 are incomplete, corrupt, or otherwise contain errors. Comparator module 10 can request through network 40 a list of the media asset identifiers on media servers 70. Comparator module 10 can also request one or more characteristics of the media assets associated with each of the media asset identifiers. Comparator module 10 can store the media asset identifiers and associated characteristics. Comparator module 10 can then, for each media asset identifier, request from the archive server 60 the one or more characteristics of each media asset stored on archive servers 60 and associated with the media asset identifiers. In some embodiments, the media assets to be compared have different media asset identifiers. In some embodiments, a cross-reference data base or list is utilized to determine which characteristics associated a media asset identifier should be compared to characteristics associated with a second media asset identifier.

In some embodiments, comparator module 10 includes a list of archive servers 60. Comparator module 10 stores the list in memory 20 as an array, linked list, or other suitable data structure. A user can provide the list to comparator module 10 through a graphical user interface. In some embodiments, the list can identify archive servers by IP address or hostname.

In some embodiments, comparator module 10 includes a list of media servers 70. Comparator module 10 stores the list in memory 20 as an array, linked list, or other suitable data structure. A user can provide the list to Comparator module 10 through a graphical user interface. The list can identify media servers by IP address or hostname.

In some embodiments, comparator module 10 includes multiple lists of media servers with each list being a subset of media servers 70. Comparator module 10 can request through network 40 a list of the media identifiers on the media servers on a particular list of media servers. Comparator module 10 can also request one or more characteristics of the media assets associated with the media asset identifiers. Comparator module 10 can store the media asset identifiers and associated characteristics. Comparator module 10 can then, for each media asset identifier, request from archive servers 60 characteristics of the media asset stored on archive servers 60 and associated with the media asset identifiers.

In some embodiments, comparator module 10 includes a list of ignored media asset identifiers. Comparator module 10 stores the list in memory 20 as an array, linked list, or other suitable data structure. A user can provide the list to comparator module 10 through a graphical user interface. In some embodiments, comparator module 10 will not acquire characteristics for any media assets associated with a media asset identifier that is on the list.

In some embodiments, comparator module 10 caches the characteristics of a media asset associated with a media asset identifier after retrieving the characteristics from an archive server 60. Comparator 10 can cache the characteristics and the associated media asset identifier in a table, array, database, or other suitable data structure in memory 20. The comparator 10 can use the cached characteristics for subsequent comparisons involving media assets with the same media asset identifier, as will be described in greater detail with reference to FIG. 3.

In some embodiments, comparator module 10 compares characteristics from more than one media assets that are associated with same media asset identifier, generating a result. In some embodiments, the result of the comparison can be presented as SUCCESS or FAILURE. Comparator module 10 can compare the characteristics of a media asset associated with a media asset identifier stored on archive server 60b, for example, to the characteristics of a media asset associated with the same media asset identifier stored on media server 70c.

In some embodiments, comparator module 10 can compare the characteristics to determine if they are identical. If the characteristics are identical, the result of the comparison can be SUCCESS. If the characteristics are not identical, the result can be FAILURE.

In some embodiments, comparator module 10 can compare the characteristics to determine whether the differences between characteristics exceed a pre-determined threshold. If the differences between characteristics do not exceed the pre-determined threshold, the result can be SUCCESS. If the differences between characteristics exceed the pre-determined threshold, the result can be FAILURE.

In some embodiments, comparator module 10 can compare a single characteristic of multiples media assets to generate a result. For example, comparator module 10 can compare the file size of a media asset associated with a particular media identifier on media server 70c to the files size of a media asset on archive server 60b associated with the same media asset identifier. In other embodiments, comparator module 10 can compare multiple characteristics to generate a result, where the result of the multiple comparisons is FAILURE if the result of any one of the comparisons is FAILURE. The result of multiple comparisons is SUCCESS if each comparison result is SUCCESS.

Comparator module 10 can notify one or more device 80 of the results of comparisons. Device 80 can be any electronic device, including a computer, software module, PDA, pager, cellular phone, or LCD display. In some embodiments, a media server can include a device as a software module. In some embodiments, an archive server can include a device as a software module.

In some embodiments, comparator module 10 sends a signal to devices 80 including the comparison results. The signal can include information indicating that no comparison result is FAILURE. The signal can include information indicating for which media assets and associated media asset identifiers on media servers 70 a comparison result is FAILURE. The signal can include the values of characteristics for which a comparison result is FAILURE. In some embodiments the signal can be a report. The report can be an email, text message, alert, or update to a webpage.

In some embodiments, the signal can cause a media server to acquire a new media asset associated with an asset identifier. The media server can include a device as a software module. The device can receive the signal over a network. The signal can include information indicating that the result of a comparison of a characteristic of a media asset associated with the media asset identifier stored on the media server and a characteristic of a media asset associated with the media asset identifier stored on an archive server was FAILURE. The signal can also include the media asset identifier. The media server can then acquire a media asset associated with the media asset identifier.

FIG. 2 illustrates the system 50 comprising three archive servers 60 and three media servers 70. It should be appreciated that system 50 can comprise one or more archive servers 60 and one or more media servers 70.

Figure 3:
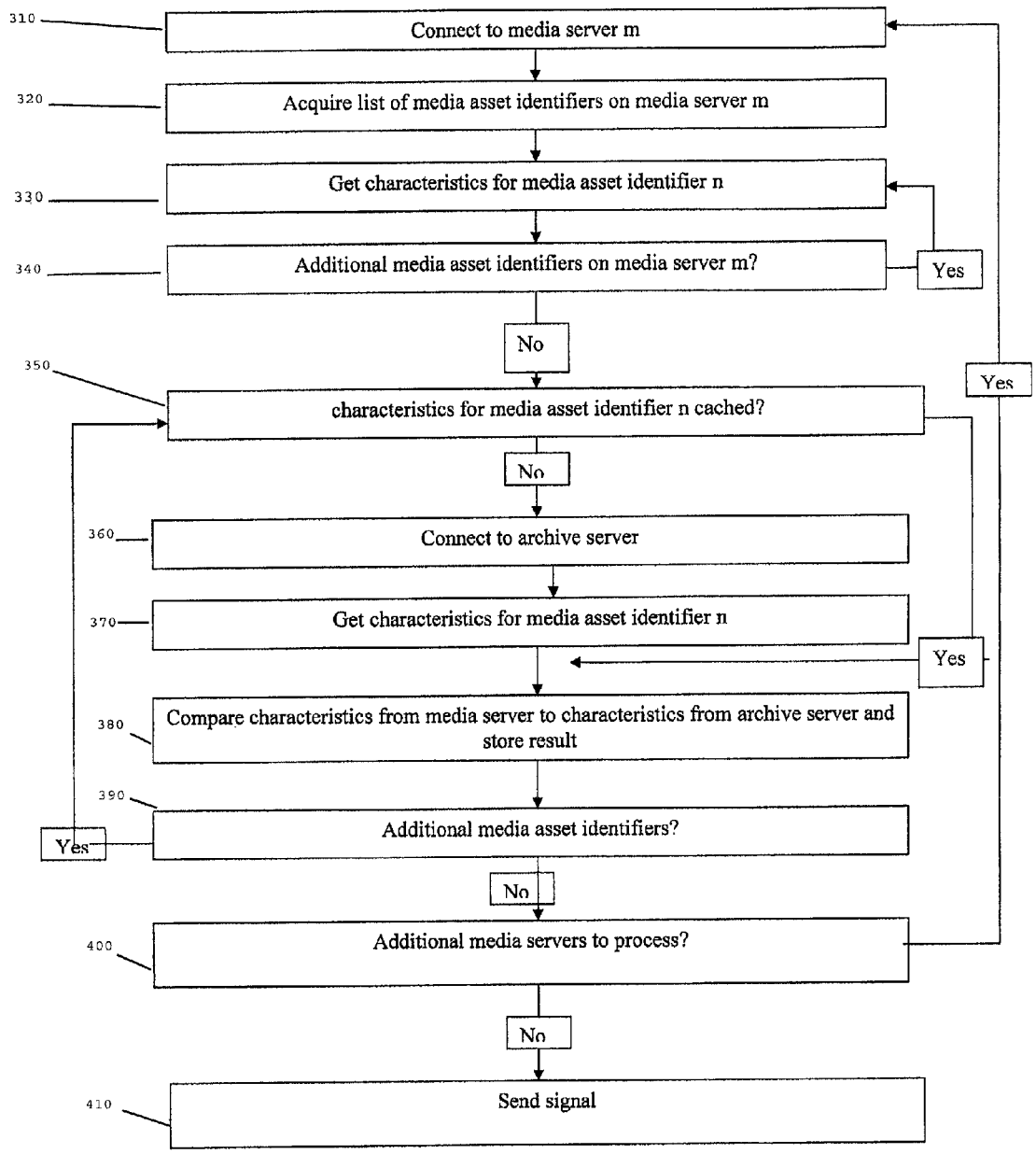
FIG. 3 is an exemplary flow chart illustrating a method of comparing media asset characteristics, according to an illustrative embodiment of the invention.

FIG. 3 is an exemplary flow chart illustrating a method of comparing characteristics of media assets, according to an illustrative embodiment of the invention. Comparator module 10 connects to media server 70a through network 40 (310). In some embodiments, media server 70a runs an FTP server. Comparator module 10 can connect to the FTP server on media server 70a using an FTP client or another program implementing the FTP protocol.

Comparator module 10 acquires a list of media asset identifiers associated with the media assets stored on media server 70a (320). In some embodiments, comparator module 10 issues a command during an FTP session with media server 70a for a list of the media assets. In some embodiments, this command is 'DIR.'

Comparator module 10 acquires characteristics of the first media asset associated with first media asset identifier from media server 70a (330). In some embodiments, the characteristics can be the file size of the media asset and the file type of the media asset provided as output from the 'DIR' command. In other embodiments, characteristics can be file name, file type, or file date stamp. Characteristics can relate to the media content, such as title, encoding, dimensions, and playout restrictions.

Comparator module 10 then checks whether there are additional media asset identifiers in the list of media asset identifiers acquired from media server 70a. If there are, comparator module 10 acquires characteristics for each media asset associated with each media asset identifier on the media server 70a (330-340). If there are no additional media asset identifiers on the list of media asset identifiers acquired from media server 70a, comparator module 10 determines if the characteristics for the media asset identifier have been cached (350).

Comparator module 10 checks for cached characteristics associated with the first media asset identifier from media server 70a (350). If comparator module 10 has cached characteristics associated with the media asset identifier, comparator module 10 compares the characteristics of the media asset on media server 70a with the cached characteristics from archive server 60a to generate a result (380). Otherwise, comparator module 10 connects to archive server 60a (360). In some embodiments, comparator 10 connects to an ftp server running on archive server 60a. Comparator 10 then acquires characteristics for the media asset associated with the media asset identifier on archive server 60a and caches the characteristics (370).

In some embodiments, comparator 10 can connect to one or more archive servers 60 to acquire characteristics for the media asset associated with the media asset identifier. For example, Comparator 10 can connect to archive server 60a to determine whether a media asset associated with the media asset identifier is stored on archive server 60a. If a media asset associated with the media asset identifier is not stored on archive server 60a, comparator 10 disconnects from archive server 60a. Comparator 10 then connects to archive server 60b to determine whether a media asset associated with the media asset identifier is stored on archive server 60b. If a media asset associated with the media asset identifier is stored on archive server 60b, comparator acquires characteristics of the media asset associated with the media asset identifier. If no archive server 60 has a media asset associated with the media asset identifier, then the result of any comparison related to that media asset identifier will be FAILURE.

Comparator module 10 compares the characteristics of the media asset on media server 70a with the cached characteristics from archive server 60a to generate a result (380). Comparator 10 compares characteristics that are of the same type. For example, comparator 10 can compare the file size of the media asset stored on media server 70a to the cached filed size. As described earlier, the comparison can determine if the characteristics are identical. The comparison can also determine if the characteristics differ by less than a pre-determined threshold in some embodiments. Comparator module 10 then can store the result of the comparison.

Comparator module 10 then determines if there are any more media asset identifiers on the list of media asset identifiers from media server 70a (390). If there are additional media asset identifiers, comparator 10 acquires characteristics associated with the asset identifier from archive server 60a if characteristics are not cached (360-370). Comparator 10 then compares the characteristics associated with media asset identifier from media server 70a to the cached characteristics associated with the media asset identifier to generate a result (380). If there are no additional media asset identifiers from the list of media asset identifiers from media server 70a, comparator module 10 determines if there are additional media servers to analyze (400).

Comparator module 10 determines if there are additional media servers 70 to analyze (e.g., media servers 70b and 70c) (400). In some embodiments, comparator module 10 includes a list of media servers. Comparator module 70 analyzes each media server on the list. If there are additional media servers 70, comparator module 10 can acquire characteristics of media assets associated with each media asset identifier on media servers 70 (310-340). Comparator module 10 can then acquire characteristics of media assets associated with the media asset identifiers on archive servers 60 (350-390). Comparator module 10 can compare characteristics associated with a media asset identifier from media servers 70 with characteristics associated with the media asset identifier from archive servers 60, generating results as previously described (380).

Comparator module then generates a signal indicating the results of one or more comparisons (410). The signal can cause a media server 70 to acquire a media asset, as previously described. In some embodiments the signal includes a report. The report can be an email, text message, alert, or update to a webpage.

FIG. 4a is an exemplary diagram illustrating a report 415 generated by an embodiment of the invention. Report 415 can be an email, text message, alert, or update to a webpage. Report 415 includes information indicating the results of comparisons performed by comparator module 10. Report 415 can include the name of a media server 420 and information indicating that the result of all comparisons involving media characteristics of media assets on the media server is SUCCESS 425. Report 415 can also include additional information such as a total number of assets 430 or an amount of time 440 comparator module 10 spent performing comparisons. Report 415 can also include a cache hit percentage 445. The cache hit percentage can be the number of times comparator module 10 found a characteristic associated with a media asset identifier cached without first retrieving the characteristic from an archive server 60 divided by the total number of media asset identifiers on media server 70.

Figure 4B:
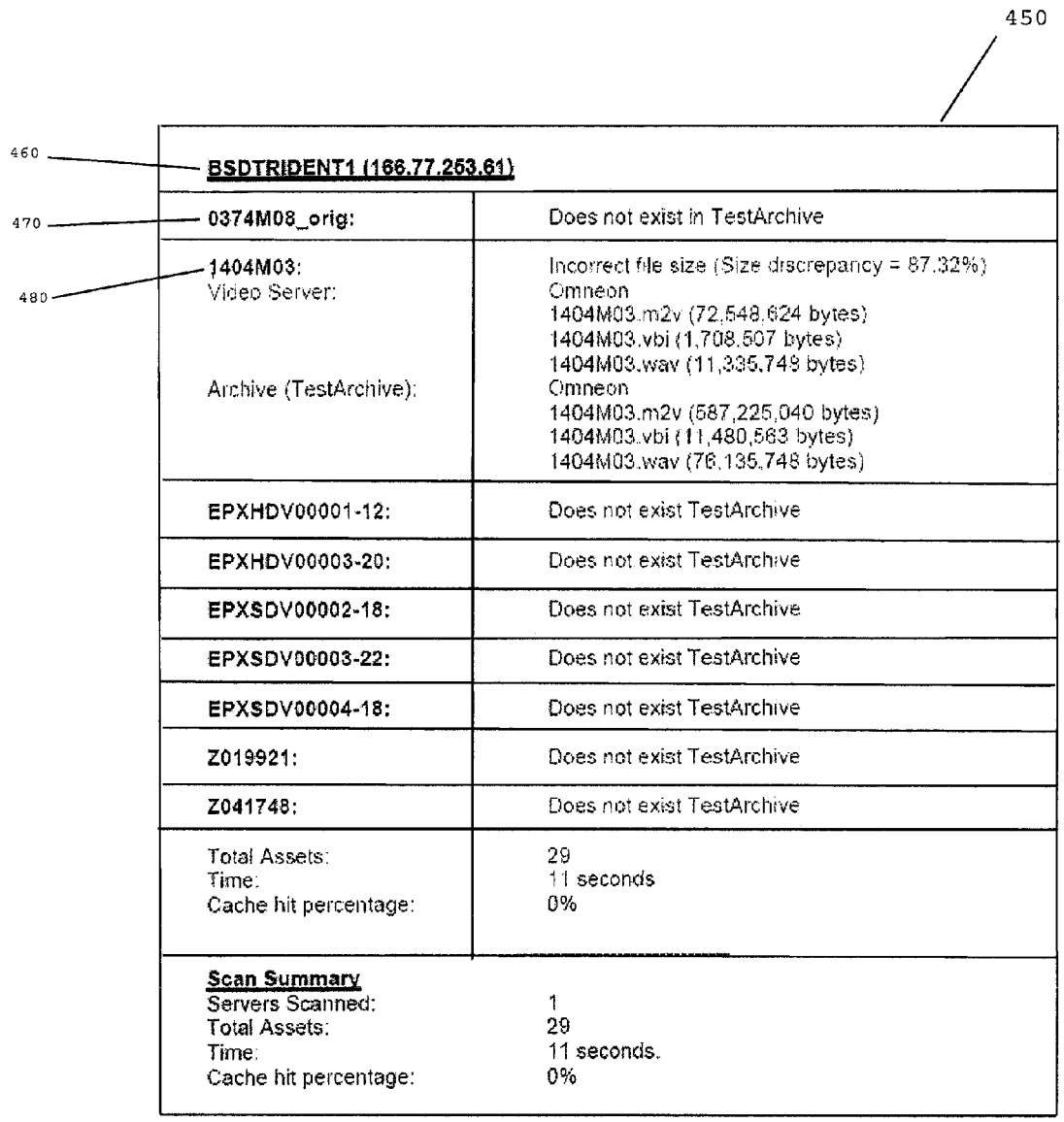
FIG. 4b is an exemplary diagram illustrating a report, according to an illustrative embodiment of the invention.

FIG. 4b is another exemplary diagram illustrating a report 450 generated by an embodiment of the invention. Report 450 can be an email, text message, alert, or update to a webpage. Report 450 includes information indicating the results of comparisons performed by comparator module 10. Report 450 can include the name of a media server 460. Report 450 can include information indicating that the results of one or more comparisons involving a media asset on the media server 460 are FAILURE. For example, report 450 includes information 470 indicating that an archive server "TestArchive" does not have a media asset associated with the media asset identifier "0374M08_orig." Report 450 further includes information 480 indicating that the file sizes for the media asset associated with media asset identifier "1404M03" on media server "BSDTRIDENT1" are not identical to the file sizes for the media asset associated with media asset identifier "1404M03" on archive server "TestArchive."

Figure 5:
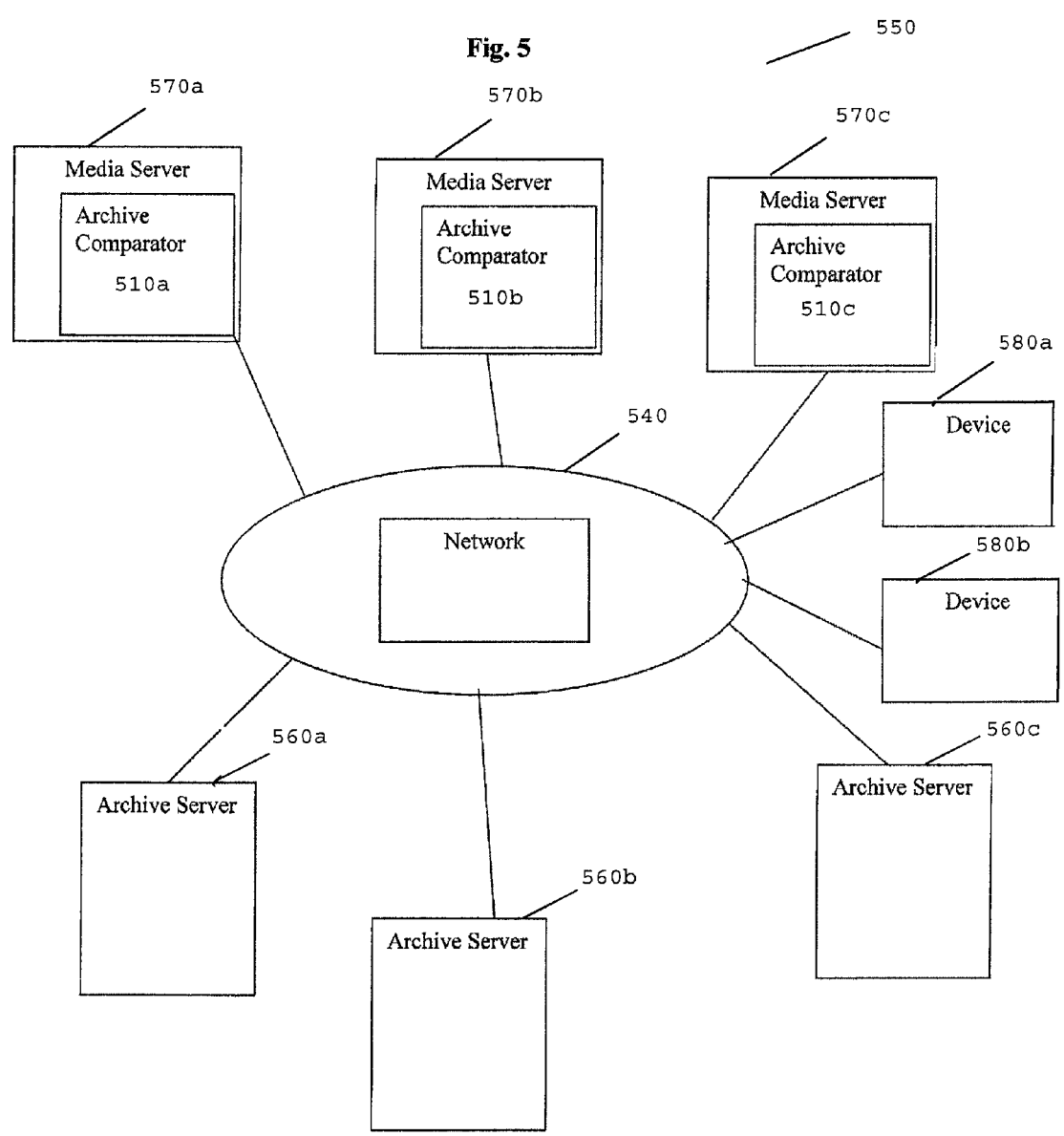
FIG. 5 is an exemplary diagram illustrating a system, according to an illustrative embodiment of the invention.

FIG. 5 is an exemplary diagram illustrating a system 550 according to an illustrative embodiment of the invention. System 550 can include archive servers 560a, 560b, and 560c (generally 560). System 550 can include media servers 570a, 570b, and 570c (generally 570). In contrast to system 50 of FIG. 1, media servers 570a, 570b, and 570c contain comparator modules 510a, 510b, and 510c, respectively. System 550 can include devices 580a and 580b (generally 580). Archive servers 560, media servers 570, and devices 580 are communicably couple by network 40. In this embodiment, comparator modules 510a, 510b, and 510c can be software modules on media servers 470.

The above-described techniques and systems can be implemented in digital electronic circuitry, or in computer hardware, firmware, software, or in combinations of them. The implementation can be as a computer program product, e.g., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

While the invention has been particularly shown and described with reference to specific illustrative embodiments, it should be understood that various changes in form and detail may be made without departing from the spirit and scope of the invention.

What is claimed is:

1. A computer-implemented method comprising:
   a) retrieving, with a comparator module, a first characteristic of a first video file associated with a first identifier from a video server storing a plurality of video files;
   b) retrieving, with the comparator module, a second characteristic of a second video file associated with a second identifier from a cache if the second characteristic of the second video file is determined to be stored in the cache and, if it is determined that the second characteristic of the second video file is not stored in the cache, retrieving the second characteristic of the second video file from an archive video server;
   c) utilizing the comparator module to compare the first characteristic to the second characteristic based on an association of the first identifier and the second identifier;
   d) analyzing, by the comparator module, the result of the comparison of the first characteristic and the second characteristic to determine if the first video file should be replaced;
   e) if the result of the comparison indicates that the first video file should be replaced, acquiring, with the video server, a third video file associated with the second identifier from the archive server, and replacing, on the video server, the first video file with the third video file; and
   f) if the result of the comparison indicates that the first video file should not be replaced, broadcasting the first video file based on a predetermined schedule.

2. The method of claim 1 further comprising the steps of:
   g) the comparator module retrieving a third characteristic describing a fourth video file and associated with a third identifier from a second video server storing a plurality of video files;
   h) the comparator module retrieving a fourth characteristic describing a fifth video file associated with a fourth identifier from a second archive video server;
   i) utilizing the comparator module to compare the third characteristic to the fourth characteristic based on an association of the third identifier and the fourth identifier;
   j) the comparator module generating a report that includes an indication of the result of the comparison of the third characteristic and the fourth characteristic.

3. The method of claim 2 wherein the second video server is the same as the first video server and the second archive video server is the same as the first archive video server.

4. The method of claim 1, step e) further comprising sending an email indicating if the result of the comparison indicates that the first video file should be replaced.

5. The method of claim 1, wherein the first and second characteristics are one of file size, file type, bitrate, and file encoding.

6. A system comprising:
   a video server that stores a first video file, the first video file associated with a first identifier and described by a first characteristic;
   an archive server that stores a second video file, the second video file associated with a second identifier and described by a second characteristic;
   a comparator module in communication with the video server, the archive server, and a cache,
   wherein the comparator communicates with the video server to retrieve the first characteristic based on the first identifier,
   wherein the comparator communicates with a cache and the archive server to retrieve the second characteristic based on the second identifier from the cache if it is determined that the second characteristic of the second video file is stored in the cache and, if it is determined that the second characteristic is not stored on the cache, to retrieve the second characteristic of the second video file from the archive server,
   the comparator module being configured to compare the first characteristic and the second characteristic based on an association of the first identifier and the second identifier and to generate a signal based on a result of the comparison of the first characteristic and the second characteristic, and
   the video server being configured to (i) receive the signal and acquire a third video file associated with the second identifier if the result is a first pre-defined value and (ii) broadcast the first video file according to a predetermined schedule if the result is a second pre-defined value.

7. The system of claim 6, wherein the signal is an email.

8. The system of claim 6, wherein the comparator module further comprises a list of one or more ignored identifiers, such that the comparator module does not retrieve the first characteristic or the second characteristic if the identifier matches the one or more ignored identifiers.

9. The system of claim 6, wherein the first characteristic and the second characteristic are one of file size, file type, bitrate, and file encoding.

10. A computer-implemented method comprising:
    a) retrieving, with a comparator module, a first characteristic of a first media asset associated with a first identifier from a media server storing a plurality of media assets;
    b) retrieving, with the comparator module, a second characteristic of a second media asset associated with a second identifier from a cache if the second characteristic of the second media asset is determined to be stored in the cache and, if it is determined that the second characteristic of the second media asset is not stored in the cache, retrieving the second characteristic of the second media asset from an archive server;
    c) utilizing the comparator module to compare the first characteristic to the second characteristic based on an association of the first identifier and the second identifier;
    d) analyzing, by the comparator module, the result of the comparison of the first characteristic and the second characteristic to determine if the first media asset should be replaced;

e) if the result of the comparison indicates that the first media asset should be replaced, generating, by the comparator module, a report that includes an indication that the first media asset should be replaced by the second media asset.

11. The method of claim 10, further comprising the media server retrieving the second media asset from the archive server when the first characteristic is not identical to the second characteristic.

12. The method of claim 10, wherein retrieving a first characteristic further comprises retrieving the first characteristic describing the first media asset and associated with the first identifier from a plurality of media servers.

13. The method of claim 10, wherein the first and second characteristics are one of file size, file type, bitrate, and file encoding.

14. The method of claim 10 further comprising generating a signal to one or more devices wherein the signal comprises data that reflects the report.

15. A non-transitory computer readable medium bearing instructions to cause one or more computers to:
retrieve a first characteristic of a first media asset and associated with a first identifier from a media server storing a plurality of media assets;
retrieve a second characteristic of a second media asset associated with a second identifier from a cache if the second characteristic of the second media asset is determined to be stored in the cache and, if it is determined that the second characteristic of the second media asset is not stored in the cache, retrieve the second characteristic of the second media asset from an archive server;
compare the first characteristic to the second characteristic based on an association of the first identifier and the second identifier;
analyze the result of the comparison of the first characteristic and the second characteristic to determine if the first media asset should be replaced;
if the result of the comparison indicates that the first media asset should be replaced, generate a report that includes an indication that the first media asset should be replaced by the second media asset.

16. The medium of claim 15, further bearing instruction to cause one or more computers to:
retrieve a third characteristic describing a third media asset and associated with a third identifier from a second media server storing a plurality of media assets;
retrieve a fourth characteristic describing a fourth media asset associated with a fourth identifier from a second archive server;
compare the third characteristic to the fourth characteristic based on an association of the third identifier and the fourth identifier;
generate a report that includes an indication of a result of the comparison of the third characteristic and the fourth characteristic.

17. The medium of claim 15, wherein the second media server is the same as the first media server and the second archive server is the same as the first archive server.

18. The medium of claim 15, further bearing instructions to cause one or more computers to generate a signal to one or more devices wherein the signal comprises data that reflects the report.

19. The medium of claim 15, wherein the signal is an email.

20. The medium of claim 15, further bearing instructions to cause one or more computers to retrieve the second media asset from the archive server when the first characteristic does not match the second characteristic.

* * * * *